H. & L. IWAN.
Draft Attachment to Plows.

No. 224,917. Patented Feb. 24, 1880.

Witnesses
Nat. E. Oliphant
Geo. R. Porter

Inventors
Henry Iwan,
Louis Iwan,
per Chas. H. Fowler
Attorney

UNITED STATES PATENT OFFICE.

HENRY IWAN AND LOUIS IWAN, OF ROBERTS, ILLINOIS.

DRAFT ATTACHMENT TO PLOWS.

SPECIFICATION forming part of Letters Patent No. 224,917, dated February 24, 1880.

Application filed January 5, 1880.

*To all whom it may concern:*

Be it known that we, HENRY IWAN and LOUIS IWAN, of Roberts, in the county of Ford and State of Illinois, have invented a new and valuable Improvement in Draft Attachments to Plows; and we do hereby declare that the following is a full, clear, and exact description of the construction and operation of the same, reference being had to the annexed drawings, making a part of this specification, and to the letters and figures of reference marked thereon.

Figure 1:
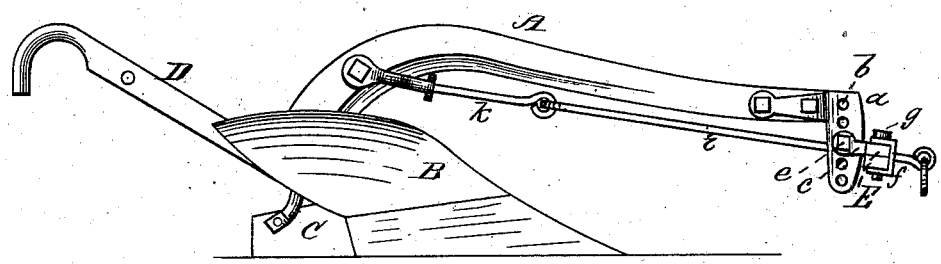
Figure 2:
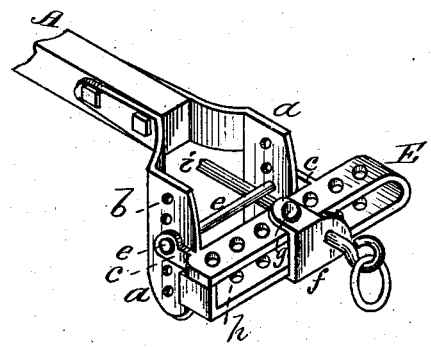

Figure 1 of the drawings is a representation of a side elevation of our invention, and Fig. 2 is a detail view of the connections at the forward end of the plow.

The present invention has relation to draft attachment to the beams of plows; and the object thereof is to allow a lighter beam being used, and also to insure a much lighter draft and a more perfect operation of the plow.

The invention consists in the peculiar arrangement and combination of the several parts hereinafter described, and subsequently pointed out in the claim.

In the accompanying drawings, A represents the beam of the plow, having the usual mold-board B, land-side C, and handles D. The beam A is preferably of metal, and has at its forward end stationary vertical brackets $a$, formed with a series of holes, $b$.

To the brackets $a$ is connected a horizontal double bar, E. The bar is formed by taking a continuous strip of metal and bending it double, the plate or strip of metal, at one of its ends, being turned up to form a rest against which the opposite end rests, and thereby prevent the strip from being folded upon itself.

The upper portion of the double bar E is formed with ears $c$, through which passes a bolt, $e$, said bolt also passing through one of the series of holes $b$, by which arrangement the double bar E is swiveled or pivoted to the brackets $a$, and capable of vertical adjustment thereon as circumstances may require.

To the double bar E is secured a guide-plate, $f$, by a pin, $g$, passing through said plate and through openings or holes $h$ in the upper and lower portions of the double bar, thereby admitting of the plate $f$ being laterally adjustable with relation to the plow-beam.

The draw-rod is made in two sections, $i\ k$, the section $i$ passing through the plate $f$ and along under the beam A, where its end is jointed to the section $k$, for convenience of taking the sections apart.

The rear end of the section $k$ of the draw-rod is swiveled to the beam A in any suitable manner that will admit of tipping the plow in any direction without interfering with the position of the double-trees.

By the arrangement at the forward end of the beam the draft or draw rod can be, at its forward end, adjusted to any required degree, either vertically or horizontally, and the double bar E makes a very strong and durable connection for holding the plate $f$, through which the draw-bar passes.

It will be observed that the double-bar E is pivotally attached to the brackets $a\ a$ by the rod $e$, so that when the double bar has been adjusted vertically, as desired, in the brackets $a\ a$ the double-bar E is capable of a vertical play to a limited extent on the rod $e$ as an axis, whereby the draft-rod, passing through the plate $f$, adjustably attached to the double bar E, is allowed a like vertical movement when meeting obstructions, and greater flexibility is imparted to the draft-rod.

We are aware that a lateral horizontally-slotted T-loop attached to the end of a plow-beam has heretofore been employed in combination with a vertically-slotted plate carrying the forward end of a draft-rod, whereby the latter may be adjusted both vertically and horizontally, and we therefore lay no claim to such construction, our invention differing from that disclaimed, in that by our construction the draft-rod may be adjusted vertically and horizontally, and after adjustment is capable of a vertical play with the double bar, as hereinbefore described.

Having now fully described our invention, what we claim as new, and desire to secure by Letters Patent, is—

The combination, with the plow-beam A, having end brackets, a, with holes b, of the double bar E, pivoted in the brackets by the bolt e, and having adjusting-holes h, perforated plate f, and jointed draft-rod sections i k, substantially as described, and for the purpose set forth.

In testimony that we claim the above we have hereunto subscribed our names in the presence of two witnesses.

HENRY IWAN.
      LOUIS IWAN.

Witnesses:
 CHRISR. ANDERSON,
 THOMAS MCNEISH.